(12) United States Patent
Chen et al.

(10) Patent No.: US 10,904,520 B2
(45) Date of Patent: Jan. 26, 2021

(54) METHOD AND DEVICE FOR INDICATING PIXEL, AND METHOD AND DEVICE FOR PROCESSING PIXEL INDICATION

(71) Applicant: SAMSUNG ELECTRONICS CO., LTD., Suwon-si (KR)

(72) Inventors: Jie Chen, Beijing (CN); Sunil Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 170 days.

(21) Appl. No.: 15/301,845

(22) PCT Filed: Apr. 2, 2015

(86) PCT No.: PCT/KR2015/003302
§ 371 (c)(1),
(2) Date: Oct. 4, 2016

(87) PCT Pub. No.: WO2015/152655
PCT Pub. Date: Oct. 8, 2015

(65) Prior Publication Data
US 2017/0150143 A1  May 25, 2017

(30) Foreign Application Priority Data
Apr. 4, 2014 (CN) .......................... 2014 1 0136293

(51) Int. Cl.
*H04B 1/66* (2006.01)
*H04N 19/105* (2014.01)
(Continued)

(52) U.S. Cl.
CPC .......... *H04N 19/105* (2014.11); *H04N 19/14* (2014.11); *H04N 19/182* (2014.11); *H04N 19/85* (2014.11); *H04N 19/91* (2014.11)

(58) Field of Classification Search
CPC ...... H04N 19/82; H04N 19/117; H04N 19/86; H04N 19/14; H04N 19/70; H04N 19/105;
(Continued)

(56) References Cited

U.S. PATENT DOCUMENTS 9,282,328 B2  3/2016  Chen et al.
9,380,320 B2  6/2016  Shen et al.
(Continued)

FOREIGN PATENT DOCUMENTS

CN  103248888 A  8/2013
CN  103636210 A  3/2014
(Continued)

OTHER PUBLICATIONS

US 10,142,631 B2, 11/2018, Yamazaki et al. (withdrawn)
(Continued)

*Primary Examiner* — Masum Billah
(74) *Attorney, Agent, or Firm* — Sughrue Mion, PLLC

(57) ABSTRACT

Disclosed are a method and a device for indicating a pixel, and a method and a device for processing a pixel indication, in video encoding and decoding. A process of indicating a pixel by an encoder includes the steps of: determining at least one processing sub-interval, determining at least one processing sub-interval to be indicated, and indicating the at least one processing sub-interval to be indicated. A process of processing a pixel indication by a decoder includes the steps of: acquiring processing sub-interval indication information, determining at least one indicated processing sub-interval, and determining all of the at least one processing sub-interval. Under the premise that flexible selection of at least one processing sub-interval is guaranteed by applying the above-mentioned technical solutions according to embodiments of the present invention, indication information of the at least one processing sub-interval to be indi-
(Continued)

cated, which is transmitted, is reduced. As a result, video compression performance is improved.

2 Claims, 2 Drawing Sheets

(51) Int. Cl.
    *H04N 19/14*     (2014.01)
    *H04N 19/182*     (2014.01)
    *H04N 19/85*     (2014.01)
    *H04N 19/91*     (2014.01)

(58) Field of Classification Search
    CPC .... H04N 19/61; H04N 19/159; H04N 19/176; H04N 19/30; H04N 19/46; H04N 19/52; H04N 19/172
    USPC ......................................................... 375/240
    See application file for complete search history.

(56) References Cited

U.S. PATENT DOCUMENTS

| | | | |
|---|---|---|---|
| 2013/0114674 A1* | 5/2013 | Chong .................. | H04N 19/86 375/240.02 |
| 2013/0188737 A1 | 7/2013 | Maani et al. | |
| 2013/0208788 A1* | 8/2013 | Chen ..................... | H04N 19/82 375/240.02 |
| 2013/0294501 A1* | 11/2013 | Sze ...................... | H04N 19/463 375/240.02 |
| 2015/0181214 A1* | 6/2015 | Alshina ................ | H04N 19/103 375/240.02 |
| 2015/0229972 A1 | 8/2015 | Park et al. | |
| 2017/0150143 A1 | 5/2017 | Chen et al. | |
| 2017/0188175 A1 | 6/2017 | Oh et al. | |
| 2018/0227578 A1 | 8/2018 | Sasai et al. | |

FOREIGN PATENT DOCUMENTS

| | | | | |
|---|---|---|---|---|
| CN | 103650511 A | | 3/2014 | |
| CN | 104717506 A | * | 6/2015 | ........... H04N 19/117 |
| EP | 3280144 A1 | * | 2/2018 | ............. H04N 19/44 |
| KR | 1020130092514 A | | 8/2013 | |
| KR | 20140034857 A | * | 3/2014 | ............. H04N 19/44 |
| KR | 1020140034857 A | | 3/2014 | |
| KR | 1020150068921 A | | 6/2015 | |
| KR | 10-2015-0116402 A | | 10/2015 | |
| WO | 2013067318 A1 | | 5/2013 | |
| WO | 2015/152665 A1 | | 10/2015 | |

OTHER PUBLICATIONS

International Search Report and Written Opinion dated Jun. 23, 2015, issued by the International Searching Authority in counterpart International Application No. PCT/KR2015/003302 (PCT/ISA/210, 220, and 237).
Guillaume Laroche et al., "AHG8: On Sample Adaptive Band Value", Joint Collaborative Team on Video Coding (JCT-VC) of ITU-T SG 16 WP 3 and ISO/IEC JTC 1/SC 29/WG 11, 17$^{th}$ Meeting: Valencia, ES, Mar. 27-Apr. 4, 2014, Document: JCTVC-Q0068, Total 6 pages.
Communication dated Jun. 22, 2016, issued by the Korean Intellectual Property Office in counterpart Korean Application No. 10-2015-0046856.
Communication dated Jan. 24, 2017, issued by the Korean Intellectual Property Office in counterpart Korean Application No. 10-2015-0046856.
Jie Chen, et al., "Sample Adaptive Offset in AVS2 Video Standard", IEEE Visual Comm. and Image Proc. Conference, Dec. 2014, pp. 69-72.
Communication dated Nov. 5, 2018, issued by the State Intellectual Property Office of the People's Republic of China in counterpart Chinese Patent Application No. 201410136293.6.
Communication dated Aug. 27, 2019 by the Indonesian Patent Office in counterpart Application No. P00201607290.
Communication dated Aug. 6, 2020, from the Brazilian Patent Office in counterpart application No. BR112016023144-9.

\* cited by examiner

METHOD AND DEVICE FOR INDICATING PIXEL, AND METHOD AND DEVICE FOR PROCESSING PIXEL INDICATION

RELATED APPLICATIONS

This application is a National stage entry of International Application No. PCT/KR2015/003302, filed on Apr. 2, 2015, which claims priority from Chinese Patent Application No. 201410136293.6, filed on Apr. 4, 2014, in the State Intellectual Property Office of P.R. China. The disclosures of each of the applications are herein incorporated by reference in their entirety.

TECHNICAL FIELD

The present disclosure relates to video encoding and decoding and more particularly, to a method and apparatus for indicating a pixel, and a method and apparatus for processing a pixel indication.

BACKGROUND ART

International video coding standard-high efficiency video coding (HEVC) and Chinese video coding standard-chinese audio video coding standard 2 (AVS2) are under development, and a sample adaptive offset technology for reducing distortion between reconstructed pixels and original pixels is adopted. In these technologies, pixels in a particular region are classified by category, and according to a category of each pixel, a particular offset value is added to a pixel corresponding to a category to be processed. An encoder transmits an applied classification method and offset values to be added to pixels on a bitstream. After obtaining the classification method, a decoder classifies pixels in a particular region using the same classification method as used in the encoder to obtain the same classification result as obtained in the encoder. The encoder offsets pixels to be processed according to the offset values transmitted on the bitstream. The pixel classification method includes two modes, an edge mode and a band mode.

The edge mode method includes comparing a value of a current pixel with a value of a neighboring pixel near the current pixel and determining a category of the current pixel according to the comparison result. According to the edge mode method, in HEVC and AVS2, pixels are classified into five categories. The foregoing standards designate a category of pixels to be offset, and thus information about the pixels to be offset is not transmitted on the bitstream.

The band mode method is different from the edge mode method. In the band mode, pixels are classified according to a value of the pixels. A range of pixel values is divided into several sub-intervals. An index of a sub-interval to which a pixel belongs is an index of a category of the pixel. In HEVC and AVS2, a range of pixel values is equally divided into 32 sub-intervals. As shown in FIG. 1, for a 8-bit video sequence, a length of each sub-interval is equal to 8. An index of a category of a current pixel is obtained according to a sub-interval to which the current pixel belongs. In the method, a category of a pixel to be offset is not fixed. The encoder selects four sub-intervals in a total of 32 sub-intervals and offset prosessing is performed for pixels on the four sub-intervals. Therefore, a sub-interval which is to be offset, referred to as an offset sub-interval, needs to be indicated on a bitstream.

In HEVC, four offset sub-intervals are designated as consecutive. Therefore, in order for the decoder to obtain the four offset sub-intervals, an index of only the first offset sub-interval, i.e., a start offset sub-interval is indicated on the bitstreram. Since an index range of a sub-interval is from 0 to 31, an index range of a start sub-interval is from 0 to 28. In entropy coding, an index of a start offset sub-interval is indicated by a binary symbol string including five binary symbols.

In AVS2, the four offset sub-intervals are merely partially consecutive. More specifically, in AVS2, the first offset sub-interval and the second offset sub-interval are consecutive, and the third offset sub-interval and the fourth offset sub-interval are consecutive. Between the second offset sub-interval and the third offset sub-interval, one or more non-offset sub-intervals may exist. Some of the four sub-intervals may be non-consecutive, such that indices of the two start offset sub-intervals are transmitted in an early stage of AVS2. In this case, an index range of each start offset sub-interval is from 0 to 30. An index of each start offset sub-interval is indicated by a binary symbol string including five binary symbols. Therefore, in the early stage of AVS2, 10 binary symbols are dedicated for information about offset sub-intervals.

TABLE 1

| Category index | Range of pixel values |
| --- | --- |
| 0 | 0~7 |
| 1 | 8~15 |
| 2 | 16~23 |
| 3 | 24~31 |
| 4 | 32~39 |
| 5 | 40~47 |
| 6 | 48~55 |
| 7 | 56~63 |
| 8 | 64~71 |
| 9 | 72~79 |
| 10 | 80~87 |
| 11 | 88~95 |
| 12 | 96~103 |
| 13 | 104~111 |
| 14 | 112~119 |
| 15 | 120~127 |
| 16 | 128~135 |
| 17 | 136~143 |
| 18 | 144~151 |
| 19 | 152~159 |
| 20 | 160~167 |
| 21 | 168~175 |
| 22 | 176~183 |
| 23 | 184~191 |
| 24 | 192~199 |
| 25 | 200~207 |
| 26 | 208~215 |
| 27 | 216~223 |
| 28 | 224~231 |
| 29 | 232~239 |
| 30 | 240~247 |
| 31 | 248~255 |

Table 1 shows a 8-bit sequence classification method in a band mode of HEVC and AVS2.

Although one index of only a start offset sub-interval is transmitted and only five binary symbols are used to indicate the offset sub-intervals in HEVC, distribution of the offset sub-intervals is limited. That is, four offset sub-intervals have to be consecutive. Thus, selection of the offset sub-intervals is not flexible for the encoder. Generally, four optimal offset sub-intervals are non-consecutive. In this case, the encoder has to select the next best solution, i.e., four consecutive offset sub-intervals. Thus, encoding performance is affected. In AVS2, the four offset sub-intervals are partially consecutive. Therefore, selection of the four offset sub-intervals is flexible. However, in the early stage of AVS2, indices of two start offset sub-intervals are transmitted on the bitstream. Thus, a total of 10 binary symbols are used for indication. As a result, the amount of data to be transmitted increases.

DETAILED DESCRIPTION OF THE INVENTION

Technical Problem

According to various embodiments of the present disclosure, there is provided a method and apparatus for indicating a pixel and a method and apparatus for processing a pixel indication, in which information to be transmitted for at least one processing sub-interval is reduced under the premise that flexible selection of the at least one processing sub-interval is guaranteed. Moreover, video compression performance is improved.

Technical Solution

A method of indicating a pixel includes determining at least one processing sub-interval including all or some pixel sub-intervals, determining at least one processing sub-interval to be indicated, which includes all or some of the at least one processing sub-interval, and indicating the at least one processing sub-interval to be indicated, with processing sub-interval indication information including processing sub-interval derivation information, or the processing sub-interval derivation information and processing sub-interval information, and transmitting the processing sub-interval indication information.

Preferably, the number of at least one processing sub-interval may be determined by the encoder and transmitted on a bitstream.

Preferably, the number of at least one processing sub-interval to be indicated may be determined by the encoder and transmitted on a bitstream.

Preferably, an index of at least one processing sub-interval to be indicated may be derived based on the processing sub-interval information.

Preferably, an index of at least one processing sub-interval to be indicated may be derived based on processing sub-interval derivation information.

Preferably, the index of the at least one processing sub-interval to be indicated may be derived based on a combination of the processing sub-interval information and the processing sub-interval derivation information.

Preferably, the processing sub-interval information may include the index of the at least one processing sub-interval to be indicated.

Preferably, the processing sub-interval derivation information may include a difference between an index of a current processing sub-interval to be indicated and an index of another processing sub-interval.

Preferably, the difference may include a difference between two neighboring processing sub-intervals to be indicated, after the at least one processing sub-interval to be indicated is ranked based on the index of the at least one processing sub-interval to be indicated.

Preferably, the two neighboring processing sub-intervals to be indicated may include a processing sub-interval to be indicated first and a processing sub-interval to be indicated last, and when the at least one processing sub-interval to be indicated is ranked from smallest to largest based on the index of the at least one processing sub-interval to be indicated, the processing sub-interval to be indicated first may follow the processing sub-interval to be indicated last.

Preferably, the number of all the pixel sub-intervals is added to the difference that is less than 0, and the difference that is greater than 0 is maintained without being changed. Preferably, the number of all the pixel sub-intervals is added to the difference that is less than 0, and the difference that is greater than 0 is maintained without being changed.

Preferably, the processing sub-interval derivation information may include differences except for a difference having a maximum absolute value among all differences.

Preferably, the processing sub-interval information may include an index of a processing sub-interval to be indicated, which is a minuend corresponding to the difference having the maximum absolute value.

Preferably, the processing sub-interval derivation information may include a difference between the index of the at least one processing sub-interval to be indicated and a predicted value of the at least one processing sub-interval to be indicated.

Preferably, the predicted value of the at least one processing sub-interval to be indicated may include an index of a pixel sub-interval including the most pixels in a current processing region.

An apparatus for indicating a pixel includes a processing sub-interval determination module configured to determine at least one processing sub-interval including all or some pixel sub-intervals, a to-be-indicated processing sub-interval determination module configured to determine at least one processing sub-interval to be indicated, which include the at least one processing sub-interval, and a processing sub-interval indication module configured to indicate the at least one processing sub-interval to be indicated, with processing sub-interval indication information including processing sub-interval derivation information, or the processing sub-interval derivation information and processing sub-interval information.

A method of processing a pixel indication includes obtaining processing sub-interval indication information, which includes processing sub-interval derivation information, or the processing sub-interval derivation information and processing sub-interval information, from a bitstream, determining at least one indicated processing sub-interval including all or some of at least one processing sub-interval, and determining all the at least one processing sub-interval, which include all or some of at least one pixel sub-intervals, based on the at least one indicated processing sub-interval.

Preferably, the number of at least one processing sub-interval may be obtained from the bitstream.

Preferably, the number of at least one indicated processing sub-interval may be obtained from the bitstream.

Preferably, an index of the at least one indicated processing sub-interval may be derived based on the processing sub-interval information.

Preferably, an index of the at least one indicated processing sub-interval may be derived based on the processing sub-interval derivation information.

Preferably, the index of the at least one indicated processing sub-interval may be derived based on a combination of the processing sub-interval information and the processing sub-interval derivation information.

Preferably, the processing sub-interval information may include the index of the at least one indicated processing sub-interval.

Preferably, the processing sub-interval information may be added to the processing sub-interval derivation information to derive the index of the at least one indicated processing sub-interval. Alternatively, to derive the index of the current indicated processing sub-interval, an index of another indicated processing sub-interval is added to the processing sub-interval derivation information corresponding to the current indicated processing sub-interval.

Preferably, the index of the current indicated processing sub-interval is obtained by performing one of the following modes.

The modes include a mode in which a sum of the processing sub-interval information and the processing sub-interval derivation information corresponding to the current indicated processing sub-interval is divided by the number of at least one pixel sub-intervals to obtain a remainder which is then determined as an index of the current indicated processing sub-interval, and a mode in which a sum of the index of another indicated processing sub-interval and the processing sub-interval derivation information corresponding to the current indicated processing sub-interval is divided by the number of at least one pixel sub-intervals to obtain a remainder which is then determined as the index of the current indicated processing sub-interval.

Preferably, the index of the current indicated processing sub-interval may be obtained by adding the predicted value of the at least one indicated processing sub-interval to the processing sub-interval derivation information corresponding to the current indicated processing sub-interval.

Preferably, the index of the current indicated processing sub-interval may be obtained by dividing a sum of the predicted value of the at least one indicated processing sub-interval and the processing sub-interval derivation information corresponding to the current indicated processing sub-interval by the number of at least one pixel sub-intervals to obtain a remainder and determining the remainder as the index of the current indicated processing sub-interval.

Preferably, the predicted value of the at least one indicated processing sub-interval may include an index of a pixel sub-interval including the most pixels in a current processing region.

An apparatus for processing a pixel indication includes an indication information obtaining module configured to obtain processing sub-interval indication information, which includes processing sub-interval derivation information, or the processing sub-interval derivation information and processing sub-interval information, from a bitstream, a processing sub-interval derivation module configured to determine at least one indicated processing sub-interval including all or some of at least one processing sub-interval, and a processing sub-interval derivation module configured to determine all the at least one processing sub-interval, which include all or some of at least one pixel sub-intervals, based on the at least one indicated processing sub-interval.

Advantageous Effects of the Invention

As is apparent from the above description, with the method and apparatus for indicating a pixel and the method and apparatus for processing a pixel indication provided according to embodiments of the present disclosure, at least one pixels are indicated in an encoding stage, indication information is transmitted to a decoding stage on a bitstream, at least one pixels of indication information are processed in the decoding stage, and at least one processing sub-interval is obtained. Therefore, under the premise that flexible selection of the at least one processing sub-interval is guaranteed, information to be transmitted for the at least one processing sub-interval may be reduced. Moreover, video compression performance is improved.

MODE OF THE INVENTION

Hereinafter, to clarify means, technical solutions, and effects of the present disclosure, the present disclosure will be described in detail with reference to the drawings and detailed embodiments.

The applicant of the present disclosure has found out that numbers of two start offset sub-intervals are not independent in an early stage of AVS2 according to technical research. For example, when an offset sub-interval is set to a certain sub-interval, another offset sub-interval may not be set to the same sub-interval as or a neighboring sub-interval adjacent to the certain sub-interval. Actually, joint distribution of indices of the two start offset sub-intervals have regularity. When the indices of the two start offset sub-intevals are directly transmitted, redundancy occurs. Thus, it is necessary to process the indices of the two start offset sub-intervals and then transmit them. Under the premise that flexible selection of the at least one processing sub-interval is guaranteed, information to be transmitted for the at least one processing sub-interval is reduced. Moreover, video compression performance is improved.

From analysis of technical problems of the background art, a large amount of information for an offset sub-interval may seem to be transmitted on a bitstream when the offset sub-interval is selected more flexibly or at random. Therefore, a method for indicating an offset sub-interval and a method for processing an offset sub-interval indication are provided. To reduce a bit rate and to improve the performance of video encoding, redundancy is removed from offset sub-interval information, such that pieces of the offset sub-interval information is compressed. The "offset" operation for a pixel sub-interval in the background art substantially includes pixel sub-interval processing. Thus, a technical solution for indicating a pixel sub-interval to be processed and a method for processing an indication of the pixel sub-interval to be processed are provided in the present disclosure according to embodiments of the present disclosure. Based on a relationship between at least one pixels and a sub-interval described in the background art, when the sub-interval is determined or indicated, the at least one pixels belonging to the sub-interval are also determined or indicated. Consequently, a method for indicating a sub-interval to be processed is actually a method for indicating a pixel. Therefore, the subject of the present disclosure includes a technical solution for indicating a pixel and a technical means for processing a pixel indication.

In the present disclosure, processing of a pixel sub-interval includes processing of at least one pixels in a pixel sub-interval, and the pixel sub-interval to be processed may be referred to as a "processing sub-interval".

Figure 1:
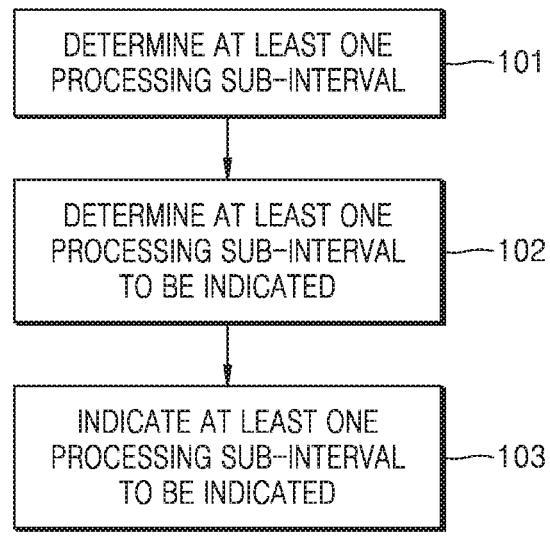
FIG. 1 is a flowchart illustrating a method for indicating a pixel according to embodiments of the present disclosure.

A method for indicating a pixel to be applied to an encoder is provided according to embodiments of the present disclosure. As can be seen in FIG. 1, the method includes a procedure provided below.

In block 101, at least one processing sub-interval is determined.

According to an original value, a reconstructed value, and/or other information of a pixel, the at least one processing sub-interval is determined in every at least one pixel sub-intervals based on a rate distortion cost or actual condition.

In block 102, at least one processing sub-interval to be indicated is determined.

Based on the actual condition, the encoder determines at least one processing sub-interval to be indicated in every at least one processing sub-interval. The at least one processing sub-interval to be indicated may include all or some of the at least one processing sub-interval.

In block 103, the at least one processing sub-interval to be indicated is indicated.

The encoder indicates the at least one processing sub-interval to be indicated, which is determined in block 102. Indication information includes processing sub-interval derivation information. The indication information may include processing sub-interval derivation information and processing sub-interval information. The processing sub-interval information includes information for an index of a processing sub-interval to be indicated. The processing sub-interval derivation information includes information combined with another information to derive the index of the processing sub-interval to be indicated. The indication information is transmitted to a decoder on the bitstream.

Figure 2:
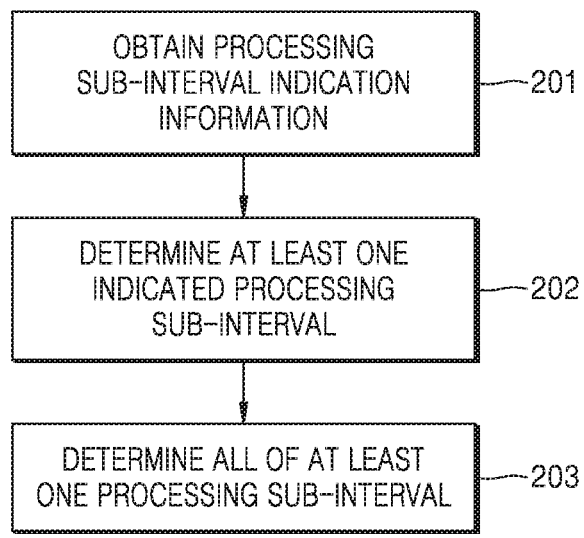
FIG. 2 is a flowchart illustrating a method for processing a pixel indication according to embodiments of the present disclosure.

A method for processing a pixel indication to be applied to a decoder is provided according to embodiments of the present disclosure. As can be seen in FIG. 2, the method includes a procedure provided below.

In block 201, processing sub-interval indication information is obtained.

The processing sub-interval indication information includes processing sub-interval derivation information. The processing sub-interval indiction information may include processing sub-interval derivation information and processing sub-interval information.

The processing sub-interval indication information is obtained by parsing a bitstream or from a bitstream parsing module.

In block 202, at least one processing sub-interval to be indicated is determined.

In block 201, the at least one processing sub-interval to be indicated is determined according to the obtained processing sub-interval indication information. Based on the processing sub-interval information, the at least one indicated processing sub-interval is directly determined. Based on the processing sub-interval derivation information and the processing sub-interval information or other information, the at least one indicated processing sub-interval is determined.

In block 203, all of at least one processing sub-interval are determined.

Based on the at least one indicated processing sub-interval determined according to an actual condition or a pre-configured condition and in operation 202, all of the at least one processing sub-interval are determined. For example, the pre-configured condition is defined in the standards.

Figure 3:
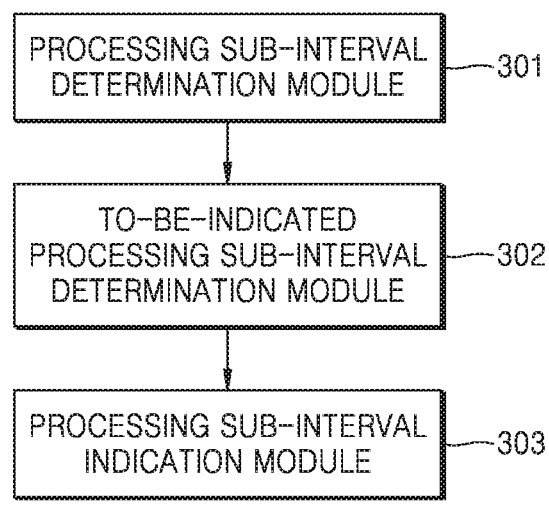
FIG. 3 is a structural diagram illustrating a structure of an apparatus for indicating a pixel according to embodiments of the present disclosure.

An apparatus for indicating a pixel in the encoder is provided according to embodiments of the present disclosure. As can be seen from FIG. 3, the apparatus may include a processing sub-interval determination module 301, a to-be-indicated processing sub-interval determination module 302, and a processing sub-interval indication module 303.

The processing sub-interval determination module is used to determine at least one processing sub-interval based on an original value, a reconstructed value, and/or another information of a pixel.

The processing sub-interval determination module to be indicated is used to determine at least one processing sub-interval to be indicated within all of the at least one processing sub-interval.

The processing sub-interval indication module is used to indicate the at least one indicated processing sub-interval, to encode indication information on a bitstream, and to transmit the indication information to another processing module.

Figure 4:
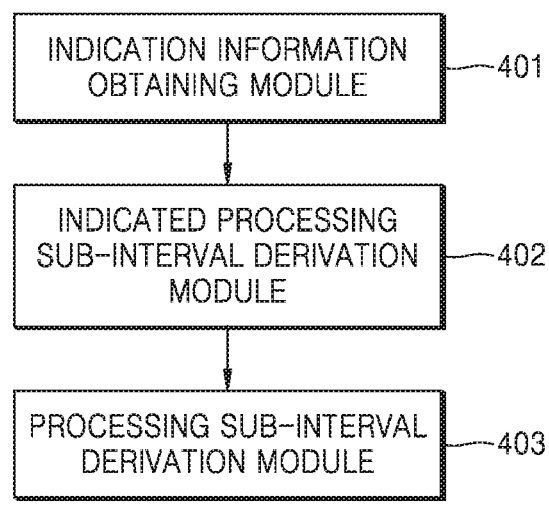
FIG. 4 is a structural diagram illustrating a structure of an apparatus for processing a pixel according to embodiments of the present disclosure.

An apparatus for processing a pixel indication in the decoder is provided according to embodiments of the present disclosure. As can be seen from FIG. 4, the apparatus may include an indication information obtaining module 401, an indicated processing sub-interval derivation module 402, and a processing sub-interval derivation module 403.

The indication information obtaining module is used to parse processing sub-interval indication information from a bitstream or to obtain the processing sub-interval indication information from the bitstream parsing module, and the processing sub-interval indication information includes processing sub-interval derivation information or includes the processing sub-interval derivation information and processing sub-interval information.

The indicated processing sub-interval derivation module is used to derive at least one indicated processing sub-interval based on the processing sub-interval indication information.

The processing sub-interval derivation module is used to derive all of at least one processing sub-interval based on the at least one indicated processing sub-interval.

Hereinafter, to clarify objects, technical solutions, and effects of the present disclosure, the present disclosure will be described in detail with reference to the drawings and detailed embodiments.

Embodiment 1

A method for indicating a pixel to be applied to an encoder is provided according to embodiments of the present disclosure. As can be seen in FIG. 1, the method includes a procedure provided below.

In block 101, at least one processing sub-interval is determined.

In the current embodiment, it is assumed that a pixel value range is divided into 16 sub-intervals from #0 to #15 in the standard or a coding system. The number of at least one processing sub-interval is equal to 2. The two processing sub-intervals are selected arbitrarily by the encoder. More specifically, a possible selection method includes selecting processing sub-intervals a and b in 16 sub-intervals.

In block 102, at least one processing sub-interval to be indicated is determined.

The encoder arbitrarily selects the at least one processing sub-interval, such that all of at least one processing sub-interval are indicated on the bitstream. Therefore, the at least one processing sub-interval is determined as the processing sub-intervals a and b.

In block 103, the at least one processing sub-interval to be indicated is indicated.

For example, a possible indication method includes a procedure provided below.

A difference between a and b, i.e., $d_1=b-a$ and $d_2=a-b$, is calculated, and b is greater than a, such that it is assumed that d1 is greater than 0 and $d_2$ is less than 0.

A sum of the differences being less than 0 and the number of all the pixel sub-intervals are calculated, and that is, $d_3=d_2+16=16+a-b$ and 16 is the number of all the sub-intervals. Thus, a relationship between $d_1$ and $d_3$ is $d_1+d_3=16$.

$d_1$ and $d_3$ are compared with each other.

When $d_1$ is not greater than $d_3$, $d_1$ ranges from 1 to 8 according to the above-described relationship between $d_1$ and $d_3$. Processing sub-interval information transmitted on a bitstream is a, and processing sub-interval derivation information transmitted on the bitstream is $d_1(=b-a)$. a ranges from 0 to 15, and may be indicated by 4-bit fixed-length encoding or variable-length encoding based on probability distribution. (b−a) ranges from 1 to 8, and may be indicated by 3-bit fixed-length encoding or variable-length encoding based on probability distribution.

When $d_3$ is not greater than $d_1$, $d_3$ ranges from 1 to 8. Processing sub-interval information transmitted on a bitstream is b, and processing sub-interval derivation information transmitted on the bitstream is $d_3(=16+a-b)$. b ranges from 0 to 15, and may be indicated by 4-bit fixed-length encoding or variable-length encoding based on probability distribution. $d_3$, i.e., (16+a-b) ranges from 1 to 8, and may be indicated by 3-bit fixed-length encoding or variable-length encoding based on probability distribution.

If $d_1$ is equal to $d_3$, the processing sub-interval information and the processing sub-interval derivation information transmitted on the bitstream may be a and $d_1$, respectively. The processing sub-interval information and the processing sub-interval derivation information transmitted on the bitstream may be b and $d_3$, respectively. Regardless of a method used from among the foregoing methods, the decoder may correctly obtain the indicated processing sub-intervals a and b.

Preferably, $d_1-1$ or $d_3-1$ may be transmitted as the processing sub-interval derivation information on the bitstream. Thus, to facilitate subsequent entropy encoding, a value of the processing sub-interval derivation information ranges from 0.

Embodiment 2

A method for indicating a pixel to be applied to an encoder is provided according to embodiments of the present disclosure. As can be seen in FIG. 1, the method includes a procedure provided below.

In block 101, at least one processing sub-interval is determined.

In the current embodiment, it is assumed that a pixel value range is divided into 16 sub-intervals from #0 to #15 in the standard or a coding system. The number of at least one processing sub-interval is equal to 2. The two processing sub-intervals are selected arbitrarily by the encoder. More specifically, a possible selection method includes selecting processing sub-intervals a and b in 16 sub-intervals.

In block 102, at least one processing sub-interval to be indicated is determined.

The encoder arbitrarily selects the at least one processing sub-interval, such that all of at least one processing sub-interval are indicated on the bitstream. Therefore, the at least one processing sub-interval is determined as the processing sub-intervals a and b.

In block 103, the at least one processing sub-interval to be indicated is indicated.

The at least one processing sub-interval to be indicated is predicted. The at least one processing sub-interval to be indicated is indicated by transmission of processing sub-interval derivation information. A possible indication method includes a procedure provided below.

A predicted value p for the at least one processing sub-interval to be indicated are generated. A possible prediction method includes determining an index of a sub-interval including the most pixels of the current processing region as the predicted value for the at least one processing sub-interval to be indicated.

Information about a difference between the at least one indices of the at least one processing processing sub-intervals to be indicated and the predicted value for the at least one processing sub-interval to be indicated is calculated. A calculation implementation method includes a procedure provided below.

A difference d1 between p and a is calculated. When a is not less than p, $d_1$ is equal to (a-p). When a is less than p, $d_1$ is equal to (a−p+16).

A difference d2 between p and b is calculated. When b is not less than p, $d_2$ is equal to (b-p). When b is less than p, $d_2$ is equal to (b−p+16).

The difference information is determined as the processing sub-interval derivation information to be transmitted. That is, $d_1$ and $d_2$ are transmitted.

Embodiment 3

A method for indicating a pixel to be applied to an encoder is provided according to embodiments of the present disclosure. As can be seen in FIG. 1, the method includes a procedure provided below.

In block 101, at least one processing sub-interval is determined.

In the current embodiment, it is assumed that a pixel value range is divided into 32 sub-intervals from #0 to #31 in the standard or a coding system. The number of at least one processing sub-interval is equal to 4. The four processing sub-intervals are selected arbitrarily by the encoder. More specifically, a possible selection method includes selecting processing sub-intervals a, b, c, and d in 32 sub-intervals.

In block 102, at least one processing sub-interval to be indicated is determined.

The encoder arbitrarily selects the at least one processing sub-interval, such that all of at least one processing sub-interval are indicated on the bitstream. Therefore, the at least one processing sub-interval to be indicated is determined as the processing sub-intervals a, b, c, and d.

In block 103, the at least one processing sub-interval to be indicated is indicated.

A possible indication method includes a procedure provided below.

a, b, c, and d are ranked. After a, b, c, and d are ranked, the order of a<b<c<d is obtained.

Thereafter, a difference between two adjacent numbers is sequentially calculated, and a difference being less than 0 is added by the number of all the sub-intervals thereto. Thus, $d_1$ (=b-a), $d_2$ (=c-b), $d_3$ (=d-c), and $d_4$ (=a-d+32) are obtained.

The greatest one of d1, d2, d3, and d4 is obtained. A minuend in calculation of the greatest difference is obtained as processing sub-interval information recorded on the bitstream, and remainders are sequentially determined as processing sub-interval derivation information recorded on the bitstream. It is assumed that d3 is the greatest difference (if two or more greatest differences exist, a minuend corresponding to any one of the two or more greatest differences may be selected as the processing sub-interval information. With the method according to the present disclosure, regardless of which one is selected, correct derivation of the at least one indicated processing sub-interval by the decoder is guaranteed). Therefore, the transmitted processing sub-interval information is d, and the processing sub-interval derivation information sequentially transmitted is $d_4$ (=a-d+32), $d_1$ (=b-a), and $d_2$ (=c-b). A value of the processing sub-interval information ranges from 0 to 31, and may be indicated by 5-bit fixed-length encoding or variable-length encoding based on probability distribution. A value of the processing sub-interval derivation information ranges from 1 to 15, and may be indicated by 4-bit fixed-length encoding or variable-length encoding based on probability distribution.

Preferably, $d_4$-1, $d_1$-1, and $d_2$-1 may be sequentially transmitted as the processing sub-interval derivation information on a bitstream. Thus, to facilitate subsequent entropy encoding, a value of the processing sub-interval derivation information ranges from 0.

Embodiment 4

A method for indicating a pixel to be applied to an encoder is provided according to embodiments of the present disclosure. As can be seen in FIG. 1, the method includes a procedure provided below.

In block 101, at least one processing sub-interval is determined.

In the current embodiment, it is assumed that a pixel value range is divided into 32 sub-intervals from #0 to #31 in the standard or a coding system. The number of at least one processing sub-interval is arbitrarily determined by the encoder. The at least one processing sub-interval is arbitrarily selected by the encoder. More specifically, a possible selection method includes selecting k processing sub-intervals $a_1, a_2, \ldots,$ and $a_k$ in 32 sub-intervals.

In block 102, at least one processing sub-interval to be indicated is determined.

The number of at least one processing sub-interval may be arbitrarily determined by the encoder, and the at least one processing sub-interval may be arbitrarily selected by the encoder, such that the number of at least one processing sub-interval, indicated by k, and all of the at least one processing sub-interval may be indicated on the bitstream. The at least one processing sub-interval to be indicated is determined as $a_1, a_2, \ldots,$ and $a_k$.

In block 103, the at least one processing sub-interval to be indicated is indicated.

A possible indication method includes a procedure provided below.

$a_1, a_2, \ldots,$ and $a_k$ are ranked. After $a_1, a_2, \ldots,$ and $a_k$ are ranked, the order of $a_1 < a_2 < a_k$ is obtained.

Thereafter, a difference between every two adjacent numbers is sequentially calculated, and a difference being less than 0 is added by the number of all the sub-intervals thereto. Therefore, $d_1$ (=$a_2-a_1$), $d_2$ (=$a_3-a_2$), ..., $d_k-1$ (=$a_k-a_{k-1}$), and dk (=$a_1-a_k+32$) are obtained.

The greatest one of $d_1, d_2, d_3, \ldots,$ and $d_k$ is obtained. A minuend in calculation of the greatest difference is obtained as processing sub-interval information recorded on the bitstream, and remainders are sequentially determined as processing sub-interval derivation information recorded on the bistream. It is assumed that $d_3$ is the greatest difference (if two or more greatest differences exist, a minuend corresponding to any one of the two or more greatest differences may be selected as the processing sub-interval information. With the method according to the present disclosure, regardless of which one is selected, correct derivation of the at least one indicated processing sub-interval by the decoder is guaranteed). Therefore, the transmitted processing sub-interval information is $a_4$, and the processing sub-interval derivation information sequentially transmitted is $d_4$ (=$a_5-a_4$), $d_5$ (=$a_6-a_5$), ..., $d_{k-1}$ (=$a_k-a_{k-1}$), $d_k$ (=$a_1-a_k+32$), $d_1$(=$a_2-a_1$), and $d_2$ (=$a_3-a_2$). A value of the processing sub-interval derivation information ranges from 0 to 31, and may be indicated by 5-bit fixed-length encoding or variable-length encoding based on probability distribution. A value of the processing sub-interval derivation information ranges from 1 to (34−k)/2, and may be indicated by corresponding bit fixed-length encoding or variable-length encoding based on probability distribution.

Preferably, the processing sub-interval derivation information from which 1 is subtracted may be transmitted on the bitstream. Thus, to facilitate subsequent entropy encoding, a value of the processing sub-interval derivation information ranges from 0.

Embodiment 5

A method for indicating a pixel to be applied to an encoder is provided according to embodiments of the present disclosure. As can be seen in FIG. 1, the method includes a procedure provided below.

In block 101, at least one processing sub-interval is determined.

In the current embodiment, it is assumed that a pixel value range is divided into 32 sub-intervals from #0 to #31 in the standard or a coding system. The number of at least one processing sub-interval is equal to 4. The four processing sub-intervals are divided into two groups. Each group includes two consecutive sub-intervals. More specifically, a possible selection method includes selecting, by the encoder, processing sub-intervals a, a+1, b, and b+1 as the processing sub-intervals in 32 sub-intervals. Herein, a condition that a, a+1, b, and b+1 are not identical to one another needs to be satisfied.

Preferably, the last sub-interval and the first sub-interval may be defined as two consecutive sub-intervals. That is, a sub-interval 0 and a sub-interval 31 are handled as two consecutive sub-intervals, and the sub-interval 0 comes after the sub-interval 31. A possible selection method includes selecting processing sub-intervals a, (a+1)mod32, b, and (b+1)mod32 as the processing sub-intervals. "mod32" indicates obtaining a remainder by division by 32. Herein, a condition that a, (a+1)mod32, b, and (b+1)mod32 are not identical to one another needs to be satisfied.

In block 102, at least one processing sub-interval to be indicated is determined.

Since the two processing sub-intervals of each group are consecutive, only a start processing sub-interval is indicated and the other processing sub-interval in each group may be derived from the indicated start processing sub-interval. Therefore, the at least one processing sub-interval to be indicated is determined as the processing sub-intervals a and b.

In block 103, the at least one processing sub-interval to be indicated is indicated.

A possible indication method includes a procedure provided below.

A difference between a and b is calculated. That is, $d_1$ is equal to (b−a), and $d_2$ is equal to (a−b). b is greater than a, such that it is assumed that $d_1$ is greater than 0 and $d_2$ is less than 0.

A sum of the differences being less than 0 and the number of all the pixel sub-intervals are calculated, and that is, $d_3=d_2+32=32+a-b$.

$d_1$ and $d_3$ are compared with each other.

When $d_1$ is not greater than $d_3$, processing sub-interval information transmitted on a bitstream is a, and processing sub-interval derivation information transmitted on the bitstream is $d_1(=b-a)$. A value of the processing sub-interval information ranges from 0 to 30 (the value ranges from 0 to 31 when the last sub-interval and the first sub-interval are handled as consecutive sub-intervals), and may be indicated by 5-bit fixed-length encoding or variable-length encoding based on probability distribution. A value of the processing sub-interval derivation information ranges from 2 to 16, and may be indicated by 4-bit fixed-length encoding or variable-length encoding based on probability distribution.

When $d_3$ is not greater than $d_1$, processing sub-interval information transmitted on a bitstream is b, and processing sub-interval derivation information transmitted on the bitstream is $d_3(=16+a-b)$. A value of the processing sub-interval information ranges from 0 to 30 (the value ranges from 0 to 31 when the last sub-interval and the first sub-interval are handled as consecutive sub-intervals), and may be indicated by 4-bit fixed-length encoding or variable-length encoding based on probability distribution. A value of the processing sub-interval derivation information ranges from 2 to 16, and may be indicated by 4-bit fixed-length encoding or variable-length encoding based on probability distribution.

If $d_1$ is equal to $d_3$, the processing sub-interval information and the processing sub-interval derivation information transmitted on the bitstream may be a and $d_1$, respectively. The processing sub-interval information and the processing sub-interval derivation information transmitted on the bitstream may be b and $d_3$, respectively. Regardless of a method used from among the foregoing methods, the decoder may correctly obtain the indicated processing sub-intervals a and b.

Preferably, $d_1$-2 or $d_3$-2 may be transmitted as the processing sub-interval derivation information on the bitstream. Thus, to facilitate subsequent entropy encoding, a value of the processing sub-interval derivation information ranges from 0.

Generally, when the number of at least one processing sub-interval is $2t$, the $2t$ processing sub-intervals are divided into two groups, and each group includes t consecutive processing sub-intervals, the method according to the embodiment may be equally applied. According to the embodiment of the present disclosure, the processing sub-interval information and the processing sub-interval derivation information transmitted on the bitstream may be determined to indicate the at least one processing sub-interval to be indicated. The value range of the processing sub-interval information and the value range of the processing sub-interval derivation information may depend on t.

Embodiment 6

A method for indicating a pixel to be applied to an encoder is provided according to embodiments of the present disclosure. As can be seen in FIG. 1, the method includes a procedure provided below.

In block 101, at least one processing sub-interval is determined.

In the current embodiment, it is assumed that a pixel value range is divided into 32 sub-intervals from #0 to #31 in the standard or a coding system. The number of at least one processing sub-interval is equal to 4. The four processing sub-intervals are divided into two groups. Each group includes two consecutive sub-intervals. More specifically, a possible selection method includes selecting, by the encoder, processing sub-intervals a, a+1, b, and b+1 as the processing sub-intervals in 32 sub-intervals. Herein, a condition that a, a+1, b, and b+1 are not identical to one another needs to be satisfied.

Preferably, the last sub-interval and the first sub-interval may be defined as two consecutive sub-intervals. That is, a sub-interval 0 and a sub-interval 31 are handled as two consecutive sub-intervals, and the sub-interval 0 comes after the sub-interval 31. A possible selection method includes selecting processing sub-intervals a, (a+1)mod32, b, and (b+1)mod32 as the processing sub-intervals. "mod32" indicates obtaining a remainder by division by 32. Herein, a condition that a, (a+1)mod32, b, and (b+1)mod32 are not identical to one another needs to be satisfied.

In block 102, at least one processing sub-interval to be indicated is determined.

Since the two processing sub-intervals of each group are consecutive, only a start processing sub-interval is indicated and the other processing sub-interval in each group may be derived from the indicated start processing sub-interval. Therefore, the at least one processing sub-interval to be indicated is determined as the processing sub-intervals a and b.

In block 103, the at least one processing sub-interval to be indicated is indicated.

The at least one processing sub-interval to be indicated is predicted. The at least one processing sub-interval to be indicated is indicated by transmission of processing sub-interval derivation information. A possible indication method includes a procedure provided below.

A predicted value p for the at least one processing sub-interval to be indicated is generated. A possible prediction method includes determining an index of a sub-interval including the most pixels of the current processing region as the predicted value for the at least one processing sub-interval to be indicated.

Information about a difference between the at least one indices of the at least one processing processing sub-intervals to be indicated and the predicted value for the at least one processing sub-interval to be indicated is calculated. A possible calculation method includes a procedure provided below.

One of a and b, which is close to p, is obtained. It is assumed that a is closer to p than b. That is, |p−a|=|p−b|.

A difference between p and a, d1 (=a−p), is calculated.

A difference $d_2$ between a and b is calculated. When b is greater than a, $d_2$ is equal to (b-a). When b is less than a, $d_2$ is equal to (b−a+32).

The difference information is determined as the processing sub-interval derivation information to be transmitted. That is, $d_1$ and $d_2$ are transmitted.

In the above embodiment, when |p−a| is equal to |p−b|, any one of a and b is determined as any one which is closer to p to perform the above procedure. With the method according to the present disclosure, regardless of which one is selected, correct derivation of the at least one indicated processing sub-interval by the decoder is guaranteed.

Generally, when the number of at least one processing sub-interval is $2t$, the $2t$ processing sub-intervals are divided into two groups, and each group includes t consecutive processing sub-intervals, the method according to the embodiment may be equally applied.

According to the embodiment of the present disclosure, the processing sub-interval information and the processing sub-interval derivation information transmitted on the bitstream may be determined to indicate the at least one processing sub-interval to be indicated. The value range of the processing sub-interval information and the value range of the processing sub-interval derivation information may depend on t.

Embodiment 7

A method for indicating a pixel to be applied to an encoder is provided according to embodiments of the present disclosure. As can be seen in FIG. 1, the method includes a procedure provided below.

In block 101, at least one processing sub-interval is determined.

In the current embodiment, it is assumed that a pixel value range is divided into 32 sub-intervals from #0 to #31 in the standard or a coding system. The number of at least one processing sub-interval is equal to 8. The eight processing sub-intervals are divided into four groups. Each group includes two consecutive sub-intervals. More specifically, a possible selection method includes selecting, by the encoder, processing sub-intervals a, a+1, b, b+1, c, c+1, d, and d+1 as the processing sub-intervals in 32 sub-intervals. Herein, a condition that a, a+1, b, b+1, c, c+1, d, and d+1 are not identical to one another needs to be satisfied.

Preferably, the last sub-interval and the first sub-interval may be defined as two consecutive sub-intervals. That is, a sub-interval 0 and a sub-interval 31 are handled as two consecutive sub-intervals, and the sub-interval 0 comes after the sub-interval 31. A possible selection method includes selecting processing sub-intervals a, (a+1)mod32, b, (b+1)mod32, c, (c+1)mod32, d, and (d+1)mod32 as the processing sub-intervals. "mod32" indicates obtaining a remainder by division by 32. Herein, a condition that a, (a+1)mod32, b, (b+1)mod32, c, (c+1)mod32, d, and (d+1)mod32 are not identical to one another needs to be satisfied.

In block 102, at least one processing sub-interval to be indicated is determined.

Since the two processing sub-intervals of each group are consecutive, only a start processing sub-interval is indicated and the other processing sub-interval in each group may be derived from the indicated start processing sub-interval. Therefore, the at least one processing sub-interval to be indicated is the processing sub-intervals a, b, c, and d.

In block 103, the at least one processing sub-interval to be indicated is indicated.

For example, a possible indication method includes a procedure provided below. a, b, c, and d are ranked. After a, b, c, and d are ranked, the order of a<b<c<d is obtained.

Thereafter, a difference between two adjacent numbers is sequentially calculated, and a difference being less than 0 is added by the number of all the sub-intervals thereto. Thus, $d_1$ (=b-a), $d_2$ (=c-b), $d_3$ (=d-c), and $d_4$ (=a-d+32) are obtained.

The greatest one of $d_1$, $d_2$, $d_3$, and $d_4$ is obtained. A minuend in calculation of the greatest difference is obtained as processing sub-interval information recorded on the bitstream, and remainders are sequentially determined as processing sub-interval derivation information recorded on the bistream. It is assumed that $d_2$ is the greatest difference (if two or more greatest differences exist, a minuend corresponding to any one of the two or more greatest differences may be selected as the processing sub-interval information. With the method according to the present disclosure, regardless of which one is selected, correct derivation of the at least one indicated processing sub-interval by the decoder is guaranteed). Therefore, the transmitted processing sub-interval information is c, and the processing sub-interval derivation information sequentially transmitted is $d_3$ (=d-c), $d_4$ (=a-d+32), and $d_1$ (=b-a). A value of the processing sub-interval information ranges from 0 to 30 (the value ranges from 0 to 31 when the last sub-interval and the first sub-interval are handled as consecutive sub-intervals), and may be indicated by 5-bit fixed-length encoding or variable-length encoding based on probability distribution. A value of the processing sub-interval derivation information ranges from 2 to 14, and may be indicated by 4-bit fixed-length encoding or variable-length encoding based on probability distribution.

Preferably, $d_3$-2, $d_4$-2, and $d_1$-2 may be sequentially transmitted as the processing sub-interval derivation information on a bitstream. Thus, to facilitate subsequent entropy encoding, a value of the processing sub-interval derivation information ranges from 0.

Generally, when the number of at least one processing sub-interval is $4t$, the $4t$ processing sub-intervals are divided into two groups, and each group includes t consecutive processing sub-intervals, the method according to the embodiment may be equally applied. According to the embodiment of the present disclosure, the processing sub-interval information and the processing sub-interval derivation information transmitted on the bitstream may be determined to indicate the at least one processing sub-interval to be indicated. The value range of the processing sub-interval information and the value range of the processing sub-interval derivation information may depend on t.

Embodiment 8

A method for indicating a pixel to be applied to an encoder is provided according to embodiments of the present disclosure. As can be seen in FIG. 1, the method includes a procedure provided below.

In block 101, at least one processing sub-interval is determined.

In the current embodiment, it is assumed that a pixel value range is divided into 32 sub-intervals from #0 to #31 in the standard or a coding system. The number of at least one processing sub-interval is equal to 2k. The 2k processing sub-intervals are selected by the encoder and are divided into k groups. Each group includes two consecutive sub-intervals. The value k is determined by the encoder. More specifically, a possible selection method includes selecting 2k processing sub-intervals $a_1$, $a_1$+1, $a_2$, $a_2$+1, . . . , $a_k$, and $a_k$+1 in 32 sub-intervals. A condition that $a_1$, $a_1$+1, $a_2$, $a_2$+1, . . . , $a_k$, and $a_k$+1 are not identical to one another needs to be satisfied.

Preferably, the last sub-interval and the first sub-interval may be defined as two consecutive sub-intervals. That is, a sub-interval 0 and a sub-interval 31 are handled as two consecutive sub-intervals, and the sub-interval 0 comes after the sub-interval 31. A possible selection method includes selecting processing sub-intervals $a_1$, ($a_1$+1)mod32, $a_2$, ($a_2$+1)mod32, . . . , $a_k$, and ($a_k$+1)mod32 as the processing sub-intervals. "mod32" indicates obtaining a remainder by division by 32. Herein, a condition that $a_1$, ($a_1$+1)mod32, $a_2$, $(a_2+1) \bmod 32, \ldots, a_k$, and $(a_k+1) \bmod 32$ are not identical to one another needs to be satisfied.

In block 102, at least one processing sub-interval to be indicated is determined.

Since the two processing sub-intervals of each group are consecutive, only a start processing sub-interval is indicated and the other processing sub-interval in each group may be derived from the indicated start processing sub-interval. Therefore, the at least one processing sub-interval to be indicated is the processing sub-intervals $a_1, a_2, \ldots,$ and $a_k$.

In block 103, the at least one processing sub-interval to be indicated is indicated.

For example, a possible indication method includes a procedure provided below.

$a_1, a_2, \ldots,$ and $a_k$ are ranked. After $a_1, a_2, \ldots,$ and $a_k$ are ranked, the order of $a_1 < a_2 < a_k$ is obtained.

Thereafter, a difference between every two adjacent numbers is sequentially calculated, and a difference being less than 0 is added by the number of all the sub-intervals thereto. Therefore, $d_1 (=a_2-a_1), d_2 (=a_3-a_2), \ldots, d_{k-1} (=a_k-a_{k-1}),$ and $d_k (=a_1-a_k+32)$ are obtained.

The greatest one of $d_1, d_2, d_3, \ldots,$ and $d_k$ is obtained. A minuend in calculation of the greatest difference is obtained as processing sub-interval information recorded on the bitstream, and remainders are sequentially determined as processing sub-interval derivation information recorded on the bistream. It is assumed that $d_2$ is the greatest difference (if two or more greatest differences exist, a minuend corresponding to any one of the two or more greatest differences may be selected as the processing sub-interval information. With the method according to the present disclosure, regardless of which one is selected, correct derivation of the at least one indicated processing sub-interval by the decoder is guaranteed). Therefore, the transmitted processing sub-interval information is $a_3$, and the processing sub-interval derivation information sequentially transmitted is $d_3(=a_4-a_3), d_4(=a_5-a_4), d_5(=a_6-a_5), \ldots, d_{k-1}(=a_k-a_{k-1}), d_k(=a_1-a_k+32),$ and $d_1(=a_2-a_1)$. A value of the processing sub-interval information ranges from 0 to 30 (the value ranges from 0 to 31 when the last sub-interval and the first sub-interval are handled as consecutive sub-intervals), and may be indicated by 5-bit fixed-length encoding or variable-length encoding based on probability distribution. A value of the processing sub-interval derivation information ranges from 2 to 18-k, and may be indicated by corresponding bit fixed-length encoding or variable-length encoding based on probability distribution.

Preferably, the processing sub-interval derivation information from which 2 is subtracted may be transmitted on the bitstream. Thus, to facilitate subsequent entropy encoding, a value of the processing sub-interval derivation information ranges from 0.

Generally, when the number of at least one processing sub-interval is t*k, the t*k processing sub-intervals are divided into k groups, and each group includes t consecutive processing sub-intervals, the method according to the embodiment may be equally applied. According to the embodiment of the present disclosure, the processing sub-interval information and the processing sub-interval derivation information transmitted on the bitstream may be determined to indicate the at least one processing sub-interval to be indicated. The value range of the processing sub-interval information and the value range of the processing sub-interval derivation information may depend on t.

Embodiment 9

A method for processing a pixel indication to be applied to the decoder is provided according to embodiments of the present disclosure. As can be seen in FIG. 2, the method includes decoding processing corresponding to Embodiment 1 and a procedure described below.

In block 201, processing sub-interval indication information is obtained.

Processing sub-interval information x and processing sub-interval derivation information y are parsed from a bitstream. Alternatively, the processing sub-interval information x and the processing sub-interval derivation information y are obtained from a bitstream parsing module.

Preferably, if 1 is subtracted from the processing sub-interval derivation information transmitted on the bitstream, the following procedures may be performed after a value of the processing sub-interval derivation information parsed from the bitstream is increased by 1 (i.e., a value of y is set to (y+1)).

In block 202, at least one processing sub-interval to be indicated is determined.

In a possible determination method, an index of the first indicated processing sub-interval expressed as a is x and an index of the second indicated processing sub-interval expressed as b is (a+y)mod16, in which "mod16" indicates obtaining a remainder by division by 16.

In block 203, all of at least one processing sub-interval are determined.

In a possible determination method, the at least one processing sub-interval includes the indicated processing sub-interval a and the indicated processing sub-interval b.

In the current embodiment, it is assumed that a pixel value range is divided into 16 sub-intervals from #0 to #15 in the standard or a coding system. Two sub-intervals are determined as the processing sub-intervals.

Embodiment 10

A method for processing a pixel indication to be applied to the decoder is provided according to embodiments of the present disclosure. As can be seen in FIG. 2, the method includes decoding processing corresponding to Embodiment 2 and a procedure described below.

In block 201, processing sub-interval indication information is obtained.

The processing sub-interval derivation information x and y are parsed from the bitstream. Alternatively, the processing sub-interval derivation information x and y are obtained from the bitstream parsing module.

In block 202, at least one processing sub-interval to be indicated is determined.

The at least one indicated processing sub-interval is predicted. Then, the at least one indicated processing sub-interval is derived according to the predicted value and the processing sub-interval derivation information transmitted on the bitstream. A possible implementation method includes a procedure described below.

The predicted value p for the at least one indicated processing sub-interval is generated. A possible generation method includes determining an index of a sub-interval including the most pixels of the current processing region as the predicted value p for the at least one indicated processing sub-interval.

The at least one indicated processing sub-interval is derived. In a possible derivation method, an index of the first indicated processing sub-interval expressed as a is (p+x) mod16 and an index of the second indicated processing sub-interval expressed as b is (p+y)mod16, in which "mod16" indicates obtaining a remainder by division by 16.

In block 203, all of at least one processing sub-interval are determined.

In a possible determination method, the at least one processing sub-interval includes the indicated processing sub-interval a and the indicated processing sub-interval b.

In the current embodiment, it is assumed that a pixel value range is divided into 16 sub-intervals from #0 to #15 in the standard or a coding system. Two sub-intervals are determined as the processing sub-intervals.

Embodiment 11

A method for processing a pixel indication to be applied to the decoder is provided according to embodiments of the present disclosure. As can be seen in FIG. 2, the method includes decoding processing corresponding to Embodiment 3 and a procedure described below.

In block 201, processing sub-interval indication information is obtained.

Processing sub-interval information x and processing sub-interval derivation information y, z, and w are parsed from a bitstream. Alternatively, the processing sub-interval information x and the processing sub-interval derivation information y, z, and w are obtained from the bitstream parsing module.

Preferably, if 1 is subtracted from the processing sub-interval derivation information transmitted on the bitstream, the following procedures may be performed after a value of the processing sub-interval derivation information parsed from the bitstream is increased by 1 (i.e., values of y, z, and w are set to (y+1), (z+1), and (w+1), respectively).

In block 202, at least one processing sub-interval to be indicated is determined.

In a possible determination method, an index of the first indicated processing sub-interval expressed as a is x, an index of the second indicated processing sub-interval expressed as b is (a+y)mod32, an index of the third indicated processing sub-interval expressed as c is (b+z)mod32, and an index of the fourth indicated processing sub-interval expressed as d is (c+w)mod32, in which "mod32" indicates obtaining a remainder by division by 32.

In block 203, all of at least one processing sub-interval are determined.

In a possible determination method, the at least one processing sub-interval includes the indicated processing sub-intervals a, b, c, and d.

In the current embodiment, it is assumed that a pixel value range is divided into 32 sub-intervals from #0 to #31 in the standard or a coding system. Four sub-intervals are determined as the processing sub-intervals.

Embodiment 12

A method for processing a pixel indication to be applied to the decoder is provided according to embodiments of the present disclosure. As can be seen in FIG. 2, the method includes decoding processing corresponding to Embodiment 4 and a procedure described below.

In block 201, processing sub-interval indication information is obtained.

Processing sub-interval information x and processing sub-interval derivation information $y_1, y_2, \ldots, y_{k-1}$ are parsed from a bitstream. Alternatively, the processing sub-interval information x and the processing sub-interval derivation information y1, y2, ..., and yk−1 are obtained from the bitstream parsing module.

In the current embodiment, the number of at least one processing sub-interval may be determined by the encoder. Therefore, before the processing sub-interval information and the sub-interval derivation information are parsed or obtained, the number of at least one processing sub-interval, designated as k, is parsed or obtained.

Preferably, if 1 is subtracted from the processing sub-interval derivation information transmitted on the bitstream, the following procedures may be performed after a value of the processing sub-interval derivation information parsed from the bitstream is increased by 1 (i.e., values of y1, y2, ..., and yk−1 are set to (y1+1), (y2+1), ..., and (yk−1+1), respectively).

In block 202, at least one processing sub-interval to be indicated is determined.

In a possible determination method, an index of the first indicated processing sub-interval expressed as a1 is x, an index of the second indicated processing sub-interval expressed as a2 is (a1+y1)mod32, an index of the third indicated processing sub-interval expressed as a3 is (a2+y2)mod32, and an index of the $k^{th}$ indicated processing sub-interval expressed as ak is (ak−1+yk−1)mod32, in which "mod32" indicates obtaining a remainder by division by 32.

In block 203, all of at least one processing sub-interval are determined.

In a possible determination method, the at least one processing sub-interval includes the indicated processing sub-intervals a1, a2, ..., ak.

In the current embodiment, it is assumed that a pixel value range is divided into 32 sub-intervals from #0 to #31 in the standard or a coding system. K sub-intervals are determined as the processing sub-intervals.

Embodiment 13

A method for processing a pixel indication to be applied to the decoder is provided according to embodiments of the present disclosure. As can be seen in FIG. 2, the method includes decoding processing corresponding to Embodiment 5 and a procedure described below.

In block 201, processing sub-interval indication information is obtained.

Processing sub-interval information x and processing sub-interval derivation information y are parsed from a bitstream. Alternatively, the processing sub-interval information x and the processing sub-interval derivation information y are obtained from the bitstream parsing module.

Preferably, if 2 is subtracted from the processing sub-interval derivation information transmitted on the bitstream, the following procedures may be performed after a value of the processing sub-interval derivation information parsed from the bitstream is increased by 2 (i.e., a value of y is set to (y+2)).

In block 202, at least one processing sub-interval to be indicated is determined.

In a possible determination method, an index of the first indicated processing sub-interval expressed as a is x and an index of the second indicated processing sub-interval expressed as b is (a+y)mod32, in which "mod32" indicates obtaining a remainder by division by 32.

In block 203, all of at least one processing sub-interval are determined.

All of the at least one processing sub-interval are derived according to the at least one indicated processing sub-interval. In a possible derivation method, the at least one processing sub-interval includes processing sub-intervals a, a+1, b, and b+1.

Preferably, the last sub-interval and the first sub-interval are two consecutive sub-intervals, and the first sub-interval is defined as following the last sub-interval. In a possible determination method, the at least one processing sub-interval includes sub-intervals a, (a+1)mod32, b, and (b+1)mod32, in which "mod32" indicates obtaining a remainder by division by 32.

In the current embodiment, it is assumed that a pixel value range is divided into 32 sub-intervals from #0 to #31 in the standard or a coding system. Four sub-intervals are determined as the processing sub-intervals. The four processing sub-intervals are divided into two groups, each of which includes two consecutive sub-intervals.

Generally, when the number of at least one processing sub-interval is 2$t$, the 2$t$ processing sub-intervals are divided into two groups, and each group includes t consecutive processing sub-intervals, the method according to the current embodiment may be equally applied. The at least one processing sub-interval is determined as including sub-intervals a, a+1, . . . , a+t−1, b, b+1, . . . , and b+t−1. The last sub-interval and the first sub-interval are two consecutive sub-intervals, and when the first sub-interval is defined as following the last sub-interval, the at least one processing sub-interval includes a, (a+1)mod32, . . . , (a+t−1)mod32, b, (b+1)mod32, . . . , and (b+t−1)mod32, in which "mod32" indicates obtaining a remainder by division by 32.

Embodiment 14

A method for processing a pixel indication to be applied to the decoder is provided according to embodiments of the present disclosure. As can be seen in FIG. 2, the method includes decoding processing corresponding to Embodiment 6 and a procedure described below.

In block 201, processing sub-interval indication information is obtained.

The processing sub-interval derivation information x and y are parsed from the bitstream. Alternatively, the processing sub-interval derivation information x and y are obtained from the bitstream parsing module.

In block 202, at least one processing sub-interval to be indicated is determined.

The at least one indicated processing sub-interval is predicted. Then, the at least one indicated processing sub-interval is derived according to the predicted value and the processing sub-interval derivation information transmitted on the bitstream. A possible implementation method includes a procedure described below.

The predicted value p for the at least one indicated processing sub-interval is generated. A possible generation method includes determining an index of a sub-interval including the most pixels of the current processing region as the predicted value p for the at least one indicated processing sub-interval.

The at least one indicated processing sub-interval is derived. In a possible derivation method, an index of the first indicated processing sub-interval expressed as a is (p+x)mod32 and an index of the second indicated processing sub-interval expressed as b is (a+y)mod32, in which "mod32" indicates obtaining a remainder by division by 32.

In block 203, all of at least one processing sub-interval are determined.

In a possible determination method, the at least one processing sub-interval includes processing sub-intervals a, (a+1), b, and (b+1).

Preferably, the last sub-interval and the first sub-interval are two consecutive sub-intervals, and the first sub-interval is defined as following the last sub-interval. In a possible determination method, the at least one processing sub-interval includes sub-intervals a, (a+1)mod32, b, and (b+1)mod32, in which "mod32" indicates obtaining a remainder by division by 32.

In the current embodiment, it is assumed that a pixel value range is divided into 32 sub-intervals from #0 to #31 in the standard or a coding system. Four sub-intervals are determined as the at least one processing sub-interval. The four processing sub-intervals are divided into two groups, each of which includes two consecutive sub-intervals.

Generally, when the number of at least one processing sub-interval is 2$t$, the 2$t$ processing sub-intervals are divided into two groups, and each group includes t consecutive processing sub-intervals, the method according to the current embodiment may be equally applied. The at least one processing sub-interval is determined as including sub-intervals a, a+1, . . . , a+t−1, b, b+1, . . . , and b+t−1. The last sub-interval and the first sub-interval are defined as two consecutive sub-intervals, and when the first sub-interval comes after the last sub-interval, the at least one processing sub-interval includes a, (a+1)mod32, . . . , (a+t−1)mod32, b, (b+1)mod32, . . . , and (b+t−1)mod32, in which "mod32" indicates obtaining a remainder by division by 32.

Embodiment 15

A method for processing a pixel indication to be applied to the decoder is provided according to embodiments of the present disclosure. As can be seen in FIG. 2, the method includes decoding processing corresponding to Embodiment 7 and a procedure described below.

In block 201, processing sub-interval indication information is obtained.

Processing sub-interval information x and processing sub-interval derivation information y, z, and w are parsed from a bitstream. Alternatively, the processing sub-interval information x and the processing sub-interval derivation information y, z, and w are obtained from the bitstream parsing module.

Preferably, if 2 is subtracted from the processing sub-interval derivation information transmitted on the bitstream, the following procedures may be performed after a value of the processing sub-interval derivation information parsed from the bitstream is increased by 2 (i.e., values of y, z, and w are set to (y+2), (z+2), and (w+2), respectively).

In block 202, at least one processing sub-interval to be indicated is determined.

In a possible determination method, an index of the first indicated processing sub-interval expressed as a is x and an index of the second indicated processing sub-interval expressed as b is (a+y)mod32, in which "mod32" indicates obtaining a remainder by division by 32.

In block 203, all of at least one processing sub-interval are determined.

All of the at least one processing sub-interval are derived according to the at least one indicated processing sub-interval. In a possible derivation method, the at least one processing sub-interval includes processing sub-intervals a, a+1, b, b+1, c, c+1, d, and d+1.

Preferably, the last sub-interval and the first sub-interval are two consecutive sub-intervals, and the first sub-interval is defined as following the last sub-interval. In a possible determination method, the at least one processing sub-interval includes sub-intervals a, (a+1)mod32, b, (b+1)mod32, c, (c+1)mod32, d, and (d+1)mod32, in which "mod32" indicates obtaining a remainder by division by 32.

In the current embodiment, it is assumed that a pixel value range is divided into 32 sub-intervals from #0 to #31 in the standard or a coding system. Eight sub-intervals are determined as the processing sub-intervals. The eight processing sub-intervals are divided into four groups, each of which includes two consecutive sub-intervals.

Generally, when the number of at least one processing sub-interval is $4t$, the $2t$ processing sub-intervals are divided into four groups, and each group includes t consecutive processing sub-intervals, the method according to the current embodiment may be equally applied. The at least one processing sub-interval is determined as including sub-intervals a, a+1, . . . , a+t−1, b, b+1, . . . , and b+t−1, c, c+1, . . . , c+t−1, d, d+1, . . . , and d+t−1. The last sub-interval and the first sub-interval are two consecutive sub-intervals, and when the first sub-interval is defined as following the last sub-interval, the at least one processing sub-interval includes a, (a+1)mod32, . . . , (a+t−1)mod32, b, (b+1) mod32, . . . , (b+t−1)mod32, c, (c+1)mod32, . . . , (a+t−1) mod32, d, (d+1)mod32, . . . , and (d+t−1)mod32, in which "mod32" indicates obtaining a remainder by division by 32.

Embodiment 16

A method for processing a pixel indication to be applied to the decoder is provided according to embodiments of the present disclosure. As can be seen in FIG. 2, the method includes decoding processing corresponding to Embodiment 8 and a procedure described below.

In block 201, processing sub-interval indication information is obtained.

Processing sub-interval information x and processing sub-interval derivation information $y_1, y_2, \ldots, y_{k-1}$ are parsed from a bitstream. Alternatively, the processing sub-interval information x and the processing sub-interval derivation information $y_1, y_2, \ldots, y_{k-1}$ are obtained from the bitstream parsing module.

In the current embodiment, since the number of at least one processing sub-interval is determined by the encoder, the number of at least one processing sub-interval, designated as k, is parsed or obtained before the processing sub-interval information and the sub-interval derivation information are parsed or obtained.

Preferably, if 2 is subtracted from the processing sub-interval derivation information transmitted on the bitstream, the following procedures may be performed after a value of the processing sub-interval derivation information parsed from the bitstream is increased by 2 (i.e., values of $y_1$, $y_2, \ldots,$ and $y_{k-1}$ are set to $(y_1+2), (y_2+2), \ldots,$ and $(y_{k-1}+2)$, respectively).

In block 202, at least one processing sub-interval to be indicated is determined.

In a possible determination method, an index of the first indicated processing sub-interval expressed as a1 is x, an index of the second indicated processing sub-interval expressed as $a_2$ is $(a_1+y_1)$mod32, an index of the third indicated processing sub-interval expressed as $a_3$ is $(a_2+y_2)$mod32, and an index of the $k^{th}$ indicated processing sub-interval expressed as $a_k$ is $(a_{k-1}+y_{k-1})$mod32, in which "mod32" indicates obtaining a remainder by division by 32.

In block 203, all of at least one processing sub-interval are determined.

All of the at least one processing sub-interval are derived according to the at least one indicated processing sub-interval. In a possible derivation method, the at least one processing sub-interval includes processing sub-intervals $a_1$, $a_1+1, a_2, a_2+1, a_k,$ and $a_k+1$.

Preferably, the last sub-interval and the first sub-interval are two consecutive sub-intervals, and the first sub-interval is defined as following the last sub-interval. In a possible determination method, the at least one processing sub-interval includes sub-intervals $a_1$, $(a_1+1)$mod32, $a_2$, $(a_2+1)$ mod32, $a_k$, and $(a_k+1)$mod32, in which "mod32" indicates obtaining a remainder by division by 32.

In the current embodiment, it is assumed that a pixel value range is divided into 32 sub-intervals from #0 to #31 in the standard or a coding system. 2K sub-intervals are determined as the processing sub-intervals by the encoder. The four processing sub-intervals are divided into k groups, each of which includes two consecutive sub-intervals. A value k is determined by the encoder.

Generally, when the number of at least one processing sub-interval is k*t, and the k*t processing sub-intervals are divided into k groups, each of which includes t consecutive processing sub-intervals, the method according to the current embodiment may be equally applied. The at least one processing sub-interval is determined as including sub-intervals $a_1, a_1+1, \ldots, a_1+t−1, a_2, a_2+1, \ldots, a_2+t−1, \ldots, a_k, a_k+1, \ldots,$ and $a_k+t−1$. The last sub-interval and the first sub-interval are two consecutive sub-intervals, and when the first sub-interval is defined as following the last sub-interval, the at least one processing sub-interval includes $a_1, (a_1+1)$mod32, . . . , $(a_1+t−1)$mod32, $a_2, (a_2+1)$ mod32, . . . , $(a_2+t−1)$mod32, . . . , $a_k, a_k+1$(mod32), . . . , and $(a_k+t−1)$mod32, in which "mod32" indicates obtaining a remainder by division by 32.

Embodiment 17

An apparatus for indicating a pixel is provided according to embodiments of the present disclosure. As can be seen from FIG. 3, the apparatus may include the processing sub-interval determination module 301, the to-be-indicated processing sub-interval determination module 302, and the processing sub-interval indication module 303.

The processing sub-interval determination module 301 determines at least one processing sub-interval based on an original value, a reconstructed value, and/or another information of a pixel in a current processing region.

The to-be-indicated processing sub-interval determination module 302 determines at least one processing sub-interval to be indicated, based on the at least one processing sub-interval determined by the processing sub-interval determination module 301 and based on an actual condition or standard.

The processing sub-interval indication module 303 indicates the at least oneprocessing sub-intervals to be indicated and encodes indication information on a bitstream or transmits the indication information to another processing module. More specifically, procedures to be performed include procedures indicating the at least one processing sub-interval in Embodiments 1 through 8 of the present disclosure, without being limited thereto.

Embodiment 18

According to embodiments of the present disclosure, an apparatus for processing a pixel indication in a decoder is provided. As can be seen from FIG. 4, the apparatus may include the indication information obtaining module 401, the indicated processing sub-interval derivation module 402, and the processing sub-interval derivation module 403.

The indication information obtaining module 401 parses processing sub-interval indication information from a bitstream or obtains the processing sub-interval indication information from the bitstream parsing module, and the processing sub-interval indication information includes processing sub-interval derivation information or includes the processing sub-interval derivation information and processing sub-interval information.

The indicated processing sub-interval derivation module 402 determines at least one indicated processing sub-interval, based on the at least one processing sub-interval indication information obtained by the processing sub-interval obtaining module 401. More specifically, procedures to be performed include procedures for determining the at least one indicated processing sub-interval in Embodiments 9 through 16 of the present disclosure, without being limited thereto.

The processing sub-interval derivation module 403 determines all of at least one processing sub-interval, based on the at least one indicated processing sub-interval determined by the indicated processing sub-interval derivation module 402 and based on an actual condition or standard.

Under the premise that flexible selection of at least one processing sub-interval is guaranteed by applying the above-mentioned technical solutions according to embodiments of the present invention, indication information of the at least one processing sub-interval to be indicated, which is transmitted, is reduced. According to embodiments of the present disclosure, a value range of processing sub-interval derivation information is smaller than a value range of processing sub-interval information. Therefore, a smaller number of bits may be used to signal the processing sub-interval derivation information. In the embodiments of the present disclosure, the entire processing sub-interval information transmitted on a bitstream or a part thereof may be replaced with the processing sub-interval derivation information. That is, the number of bits dedicated to the indication information to be transmitted is reduced, and by doing so, to improve the performance of video coding, the processing sub-interval derivation information or a combination of the processing sub-interval derivation information and the processing sub-interval information may be employed to indicate the at least one processing sub-interval.

The above description includes preferable embodiments of the present disclosure, and does not the scope of the present disclosure. Any modifications, equivalents, substitutions, or improvements made in the spirit and principle of the present disclosure fall within the scope of the present disclosure.

The invention claimed is:

1. A method of processing pixel indication performed by at least one processor, the method comprising:
obtaining, from a bitstream, processing sub-interval indication information comprising processing sub-interval information and processing sub-interval derivation information; and
determining indicated processing sub-intervals according to the processing sub-interval indication information and determining a remainder of processing sub-intervals except for the indicated processing sub-intervals from among all of the processing sub-intervals,
wherein the indicated processing sub-intervals include a first indicated processing sub-interval and a second indicated processing sub-interval,
wherein when the indicated processing sub-intervals are determined, the first indicated processing sub-interval is determined according to the processing sub-interval information, and the second indicated processing sub-interval is determined by adding a value of the processing sub-interval information to a value of the processing sub-interval derivation information plus 2,
wherein a pixel value range is divided into sub-intervals, and all of the processing sub-intervals are a part of the sub-intervals,
wherein the processing sub-interval information includes information which indicates a first index of an indicated processing sub-interval, and the processing sub-interval derivation information includes information which is combined with the processing sub-interval information to derive a second index of the indicated processing sub-interval, and
wherein the processing sub-interval derivation information indicates difference, between an index of the first indicated processing sub-interval and an index of the second indicated processing sub-interval, minus 2.

2. An apparatus for processing pixel indication, the apparatus comprising:
at least one processor configured to obtain, from a bitstream, processing sub-interval indication information comprising processing sub-interval information and processing sub-interval derivation information, to determine indicated processing sub-intervals according to the processing sub-interval indication information and to determine a remainder of processing sub-intervals except for the indicated processing sub-intervals from among all of the processing sub-intervals,
wherein the indicated processing sub-intervals include a first indicated processing sub-interval and a second indicated processing sub-interval,
wherein when the at least one processor determines the indicated processing sub-intervals, the first indicated processing sub-interval is determined according to the processing sub-interval information, and the second indicated processing sub-interval is determined by adding a value of the processing sub-interval information to a value of the processing sub-interval derivation information plus 2,
wherein a pixel value range is divided into sub-intervals, and all of the processing sub-intervals are a part of the sub-intervals,
wherein the processing sub-interval information includes information which indicates a first index of an indicated processing sub-interval, and the processing sub-interval derivation information includes information which is combined with the processing sub-interval information to derive a second index of the indicated processing sub-interval, and
wherein the processing sub-interval derivation information indicates difference, between an index of the first indicated processing sub-interval and an index of the second indicated processing sub-interval, minus 2.

* * * * *